Figure 1:
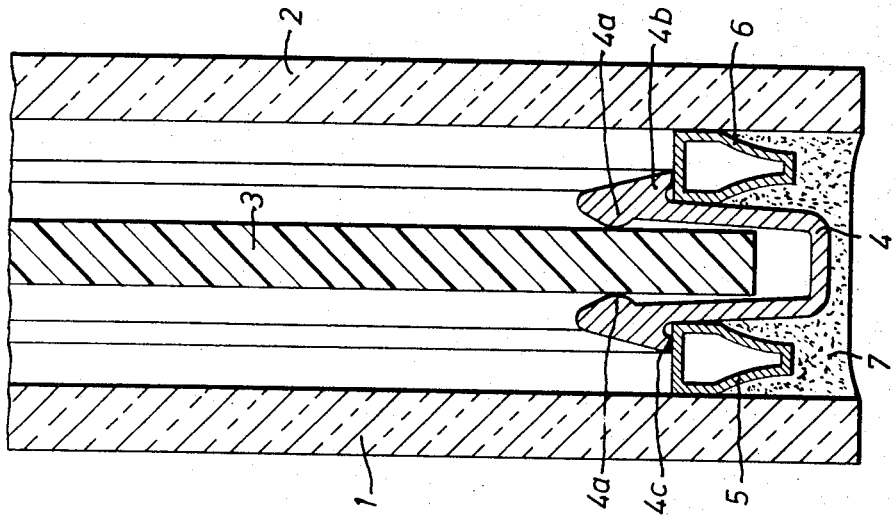

United States Patent [19]
Losell

[11] 3,837,129
[45] Sept. 24, 1974

[54] MULTIPLE GLAZING UNIT

[75] Inventor: Ernst Ingvar Losell, Malmo, Sweden

[73] Assignee: AB Emmaboda Glasverk, Emmaboda, Sweden

[22] Filed: Oct. 20, 1972

[21] Appl. No.: 299,486

[30] Foreign Application Priority Data
Oct. 29, 1971  Sweden............................ 13762/71

[52] U.S. Cl....................... 52/309, 52/616, 52/304, 161/45, 161/183
[51] Int. Cl........................................... B32b 17/10
[58] Field of Search............ 52/304, 305, 308, 616, 52/627–628; 161/45, 183, 100; 156/99, 107, 109

[56] References Cited
UNITED STATES PATENTS

| | | | |
|---|---|---|---|
| 3,030,673 | 4/1962 | London............................ | 52/616 X |
| 3,045,297 | 7/1962 | Ljungdahl............................ | 161/45 |
| 3,226,903 | 1/1966 | Lillethun.............................. | 52/616 |
| 3,630,814 | 12/1971 | Arnold................................. | 161/45 |
| 3,666,614 | 5/1972 | Snedeker et al..................... | 161/183 |

*Primary Examiner*—George F. Lesmes
*Assistant Examiner*—Henry F. Epstein
*Attorney, Agent, or Firm*—Browne, Beveridge, Degrandi & Kline

[57] ABSTRACT

A multiple glazing unit comprising two glass sheets and at least one impact resistant middle sheet of plastic material which to compensate for the elongation of the plastic and for temperature changes is so mounted that there is an additional space for the middle sheet in which to expand in its own plane. The means for mounting the middle sheet is a U-shaped strip which engages the middle sheet only by means of the extremities of the U-limbs and which clamps the middle sheet solely by its inherent resilience.

3 Claims, 2 Drawing Figures

PATENTED SEP 24 1974   3,837,129

MULTIPLE GLAZING UNIT

This invention relates to a multiple glazing unit which in addition to its traditional tasks is adapted to protect the premises inside the glazing unit and primarily the inhabitants of the premises against such external attacks in which stones and bombs are thrown and even fire arms are used, which is becoming more and more frequent when the attacks are directed against embassies, consulates, police stations and like premises as well as shops having desirable commodities on display.

For such multiple glazing units use can be made of a plastic material, polycarbonate, which is transparent like glass and has a very high impact resistance. However, this material is not as hard as glass but is easily scratched and as a rule it can therefore be used only in combination with glass, one or more polycarbonate sheets being interposed between a pair of glass sheets which thus normally protect said polycarbonate sheets against mechanical damage and against dirt.

The manufacture of such composite glazing units which are preferably heat and sound insulating by reason of interstices between the sheets, includes assembling the sheets into a unit which can be mounted in a window sash or frame without any particular difficulties. A new problem is encountered in such mounting: the dilatation coefficient of the polycarbonate is approximately eight times as great as that of glass, and it is therefore imperative to mount the polycarbonate sheet in such a way between the glass sheets that it can expand and contract in relation to the glass sheets without any risk that the setting of the polycarbonate sheet is damaged or the hermetic sealing of the glazing unit is jeopardized.

To solve the problem outlined above the invention relates to a multiple glazing unit comprising two glass sheets and at least one sheet of plastic material of high impact resistance, preferably polycarbonate, interposed between said glass sheets. According to the invention, the sheet of plastic is mounted in a U profile mounting strip fastened between the glass sheets along the edges thereof, and at at least one of each pair of opposite edges the polycarbonate sheet has clearance in the strip for thermal expansion in its own plane greater than the corresponding expansion of the glass sheets, and the mounting strip is so profiled and dimensioned as to elastically widen at the mounting of the sheet of plastic material and then to have only its free edges engaging the faces of the plastic sheet.

To hold the middle sheet and simultaneously to let it have the largest possible freedom to resiliently absorb impacts the mounting strip on the inner side of its flanges at the free edges thereof is formed with a pair of beads leaving between them a clearance which in the untensioned state of the strip is smaller than the thickness of the sheet of plastic while the remaining clearance between the flanges is constant and larger than said thickness.

In order not to impede the movement of the middle sheet unnecessarily as ambient temperature changes the mounting strip is fastened between the glass sheets by means of a device leaving edge portions of the mounting strip flanges free so that said portions will engage the sheet of plastic substantially only by their inherent resilience.

To space the middle sheet the desired distance from the surrounding glass sheets the mounting strip is fastened between a pair of spacing strips which are retained together with the mounting strip between the glass sheets by a sealing composition.

Furthermore, the mounting strip on the outer side of the flanges has projections for localization of the mounting strip and the spacing strips in relation to each other.

Figure 2:
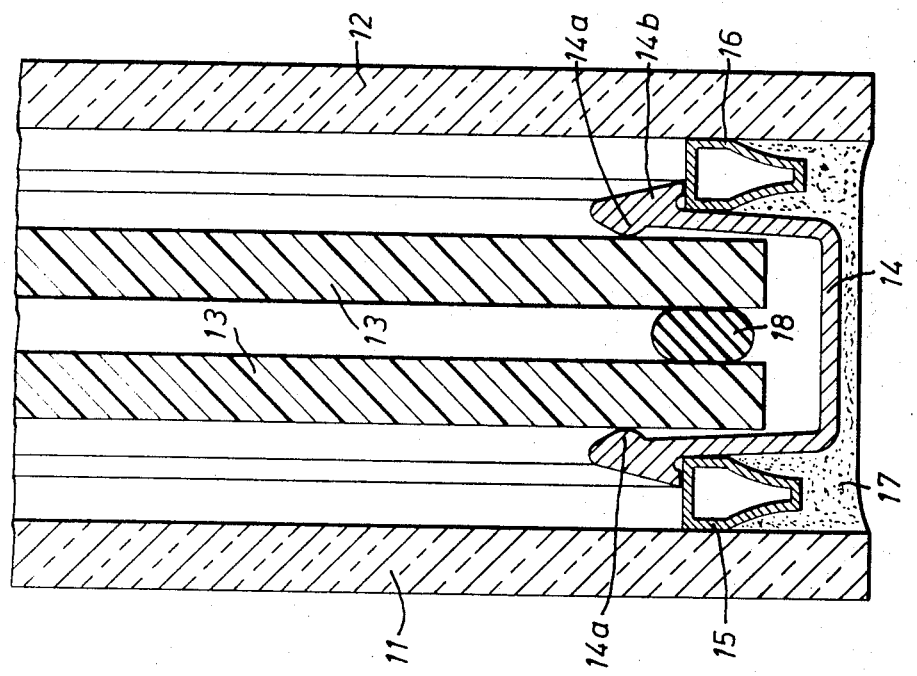

The invention will be more fully described hereinbelow with reference to the accompanying drawing in which:

FIG. 1 in partial cross section shows a glazing unit designed in accordance with the invention and having one middle sheet of polycarbonate;

FIG. 2 in partial cross section shows a glazing unit designed in accordance with the invention and having two middle sheets of polycarbonate.

The figures are drawn on an enlarged scale.

In FIG. 1, 1 and 2 denote a pair of glass sheets and 3 denotes a polycarbonate sheet which is mounted in a U-profile strip 4 of special design and dimensions, which is fixed between the glass sheets.

In the untensioned state the U-profile strip 4 which is of metal, preferably aluminium, has parallel flanges each of which has a bead 4a on the inner side of its free edge. The strip is so dimensioned that the gap between the beads 4a is slightly smaller, while the distance between the remaining flanges is slightly larger, than the thickness of the middle sheet 3. When upon assembly of the glazing unit the strip 4 is mounted to the middle sheet 3 the U-profile is thus elastically widened and will engage the faces of the middle sheet 3 solely linearly by means of the rounded beads 4a. This will provide a mounting in which the middle sheet is not clamped but has the maximum freedom possible to resiliently yielding to an impact, whereby it can absorb a large amount of impact energy without breaking.

Upon assembly it is further ensured that the strips 4 at each pair of opposed edges of the glazing unit will be spaced such a relative distance apart that the measure between the U-profile webs is larger than the corresponding measure of the middle sheet 3 so that the sheet at at least two edges at right angles to one another has sufficient clearance for thermal expansion with due consideration of the fact that the dilatation coefficient of the polycarbonate is much greater than that of glass.

The mounting strip 4 is kept at the desired distance from the two glass sheets 1 and 2 by a pair of hollow spacing strips 5 and 6 which like the mounting strip are made of metal, preferably aluminium. These spacing strips are kept in a definite position in relation to the mounting strip also in the plane of the glazing unit in that the spacing strip on the outer side of the flanges at the free edges thereof have projections 4b of hook-shaped cross section, thus forming abutments 4c against which bear the inner edges of the spacing strips. By this arrangement the edge portions of the mounting strip flanges having the beads 4a will be left without external support, which implies that the beads 4a are pressed against the polycarbonate sheet 3 only by the inherent resilience of the flanges, and at temperature changes the polycarbonate sheet can thus move without being appreciably restrained by friction against the beads.

The strips 4, 5 and 6 need not necessarily form a fully closed frame but can be supplemented at the corners with separate corner pieces of prior art design.

The whole packet of sheets and strips is kept together and maintained hermetically closed by a sealing composition 7 which has been placed between the marginal portions of the glass sheets 1 and 2 outside of the strips, and to have a firm hold in the sealing composition the spacing strips 5 and 6 are tapered in the manner of wedges at their outer edges.

The spacing strips are suitably perforated in a known manner at their inner edges so that their hollow space will communicate with the interstices between the sheets, and are filled with a moisture absorbing substance that prevents misting by keeping the air within the glazing unit dry.

FIG. 2 shows an embodiment in which two polycarbonate sheets 13 are fixed between two glass sheets 11, 12 by means of a pair of spacing strips 15, 16 and a U-profile strip 14 of sufficient width having beads 14a and projections 14b like the strip 4, a sealing composition 17 as well as an intermediate strip 18 interposed between the marginal portions of the polycarbonate sheets, said strip consisting of a soft elastic material such as rubber.

With very moderate dimensions, for instance polycarbonate sheets of 5 mm thickness, a glazing unit of the design illustrated in FIG. 2 is capable of not only withstanding attacks with stones and like solid articles but also serving as a protection against bullets fired from light fire arms. By reason of the individual resilience of the two sheets the two thin sheets can absorb more impact energy than a single sheet of double thickness.

What I claim and desire to secure by Letters Patent is:

1. A multiple glazing unit including two glass sheets and an intermediate means comprising at least one sheet of polycarbonate plastic material of high impact resistance interposed between said glass sheets, said intermediate means being mounted in a metal mounting strip positioned between the glass sheets along the edges thereof and, wherein the mounting strip has U-profile, and at at least one of each pair of opposite edges the intermediate means has clearance in the strip for thermal expansion in its own plane greater than the corresponding expansion of the glass sheets, and the U-profile mounting strip, in which the intermediate means is inserted, on the inner side of its flanges at the free edges thereof is formed with a pair of beads engaging the intermediate means while the remaining part of the flanges has a clearance larger than the thickness of the intermediate means, and the U-profile mounting strip on the outer sides of its flanges has projections resting on a pair of hollow metal spacing strips which are localized between the intermediate means and the glass sheets and which are retained together with the U-profile mounting strip between the glass sheets by a sealing composition.

2. A multiple glazing unit as claimed in claim 1, wherein the intermediate means consists of a single sheet of polycarbonate resin.

3. A multiple glazing unit as claimed in claim 1, wherein the intermediate means consists of two sheets of polycarbonate resin spaced apart by a strip of a soft elastic material at the marginal portions of said sheets.

* * * * *